US008632742B2

(12) United States Patent
Keiser et al.

(10) Patent No.: US 8,632,742 B2
(45) Date of Patent: Jan. 21, 2014

(54) METHODS OF CONTROLLING MERCURY EMISSION

(71) Applicant: Nalco Company, Naperville, IL (US)

(72) Inventors: Bruce A. Keiser, Plainfield, IL (US);
Jitendra Shah, Naperville, IL (US);
John V. Meier, Chicago, IL (US);
Robert W. Dorner, Naperville, IL (US);
Jianwei Yuan, Aurora, IL (US);
Rebecca L. Stiles, Naperville, IL (US);
Wayne Carlson, Batavia, IL (US);
Darlington Mlambo, Naperville, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 13/657,484

(22) Filed: Oct. 22, 2012

(65) Prior Publication Data

US 2013/0180923 A1 Jul. 18, 2013

Related U.S. Application Data

(63) Continuation-in-part of application No. 13/366,441, filed on Feb. 6, 2012, and a continuation-in-part of application No. 13/366,461, filed on Feb. 6, 2012, and a continuation-in-part of application No. 13/366,610, filed on Feb. 6, 2012, and a continuation-in-part of application No. 13/366,630, filed on Feb. 6, 2012, each which is a continuation-in-part of application No. 11/952,637, filed on Dec. 7, 2007, now Pat. No. 8,110,163.

(51) Int. Cl.
*B01D 53/64* (2006.01)
*C02F 1/68* (2006.01)

(52) U.S. Cl.
USPC ........... 423/210; 210/749; 210/750; 210/758; 210/914

(58) Field of Classification Search
USPC .................. 210/749, 750, 758, 914; 423/210
See application file for complete search history.

(56) References Cited

U.S. PATENT DOCUMENTS

| 4,039,446 | A | | 8/1977 | Ban et al. |
| 4,451,351 | A | | 5/1984 | Porter |
| 4,465,593 | A | | 8/1984 | Wemhoff |
| 4,670,180 | A | | 6/1987 | Moriya et al. |
| 4,731,187 | A | | 3/1988 | Moriya et al. |
| 5,164,095 | A | * | 11/1992 | Sparapany et al. ........... 210/735 |
| 5,401,420 | A | | 3/1995 | Siefert et al. |
| 5,500,133 | A | * | 3/1996 | Carey et al. .................. 210/729 |
| 5,510,040 | A | | 4/1996 | Miller et al. |
| 5,523,002 | A | | 6/1996 | Carey et al. |
| 5,658,487 | A | | 8/1997 | Carey et al. |
| 5,854,173 | A | | 12/1998 | Chang et al. |
| 6,398,039 | B1 | | 6/2002 | Xue et al. |
| 6,403,726 | B1 | | 6/2002 | Ward |
| 6,521,021 | B1 | | 2/2003 | Pennline |
| 6,527,828 | B2 | | 3/2003 | Flippo et al. |
| 6,808,692 | B2 | | 10/2004 | Oehr |
| 6,818,043 | B1 | | 11/2004 | Chang et al. |
| 6,878,358 | B2 | | 4/2005 | Vosteen et al. |
| 6,942,840 | B1 | * | 9/2005 | Broderick ..................... 423/101 |
| 6,953,494 | B2 | | 10/2005 | Nelson, Jr. |
| 7,473,303 | B1 | | 1/2009 | Higgins et al. |
| 7,572,420 | B2 | | 8/2009 | Honjo et al. |
| 7,713,503 | B2 | | 5/2010 | Maly et al. |
| 7,722,843 | B1 | * | 5/2010 | Srinivasachar ............... 423/210 |
| 7,727,307 | B2 | | 6/2010 | Winkler |
| 7,776,780 | B1 | | 8/2010 | Granite et al. |
| 7,833,500 | B1 | | 11/2010 | Pan et al. |
| 7,871,586 | B2 | | 1/2011 | Harada et al. |
| 7,918,919 | B2 | | 4/2011 | Hillier et al. |
| 8,088,348 | B2 | | 1/2012 | Ukai et al. |
| 8,110,163 | B2 | * | 2/2012 | Keiser et al. .................. 423/210 |
| 8,142,548 | B2 | | 3/2012 | Higgins et al. |
| 8,211,389 | B2 | | 7/2012 | Zinn et al. |
| 2003/0104969 | A1 | | 6/2003 | Caswell et al. |
| 2003/0110948 | A1 | | 6/2003 | Gaita et al. |
| 2004/0045437 | A1 | | 3/2004 | Chang et al. |

(Continued)

FOREIGN PATENT DOCUMENTS

EP 0506132 9/1992
JP 57-091785 A * 6/1982 ................ C02F 1/04

(Continued)

OTHER PUBLICATIONS

Kairies et al., "Mercury in gypsum produced from flue gas desulfurization," Fuel 2006, 85, 2530-2536.
O'Driscoll et al., "Continuous analysis of dissolved gaseous mercury in freshwater lakes," Science of the Total Environment, 2003, 304, 285-294.
Gustin et al., "Evaluation of wetland methyl mercury export as a function of experimental manipulations," Journal of Environmental Quality, 2006, 35(6), 2352-2359.
Beatty et al., "Testing Mechanisms of Mercury Retention in FGD Products," 2007 World of Coal Ash (WOCA), May 7-10, 2007, Northern Kentucky, USA, 4 pages.

(Continued)

*Primary Examiner* — Timothy Vanoy
(74) *Attorney, Agent, or Firm* — Michael Best & Friedrich, LLP

(57) ABSTRACT

Disclosed are methods for controlling, mercury emissions, and more particularly, to methods for controlling mercury re-emissions from a wet flue gas desulfurizer used in a combustion process. A method of controlling mercury re-emission from a combustion process includes measuring either mercury concentration, oxidation-reduction, potential (ORP), and/or sulfide concentration within a scrubber liquor of a wet flue gas desulpherizer (wFGD); correlating the mercury concentration, ORP, and /or sulfide concentration with an amount of mercury re-emission additive required in the scrubber liquor to reduce and/or prevent mercury re-emission to a selected level; and adjusting the rate of addition of mercury re-emission additive into the scrubber liquor to attain the selected level of mercury re-emission.

28 Claims, 7 Drawing Sheets

(56) References Cited

U.S. PATENT DOCUMENTS

| | | |
|---|---|---|
| 2005/0000901 A1 | 1/2005 | Campbell et al. |
| 2005/0147549 A1 | 7/2005 | Lissianski et al. |
| 2008/0202396 A1 | 8/2008 | Aradi et al. |
| 2010/0061909 A1 | 3/2010 | Kawamura et al. |
| 2010/0284878 A1 | 11/2010 | Ukai et al. |
| 2011/0020205 A1 | 1/2011 | Kawamura et al. |
| 2011/0027153 A1 | 2/2011 | Dickson |
| 2011/0262326 A1 | 10/2011 | Steen et al. |

FOREIGN PATENT DOCUMENTS

| | | |
|---|---|---|
| JP | 57091785 | 6/1982 |
| JP | 2000015222 | 1/2000 |
| JP | 2000063794 | 2/2000 |
| WO | 2009092575 | 7/2009 |

OTHER PUBLICATIONS

Currie et al., "Bench-scale Kinetics Study of Mercury Reactions in FGD Liquors," <www.prod75-interl.netl.doe.gov/publications/proceedings/06/mercury/presentations/Currie_presentation_121206.pdf> 26 pages.

Blythe et al., "Field Testing of a Wet FGD Additive for Enhanced Mercury Control," Final Report, Mar. 2008, Cooperative Agreement No. DE-FC26-04NT42309, 101 pages.

Blythe et al., "Bench-scale Kinetics Study of Mercury Reactions in FGD Liquors," Sep. 30, 2004-Mar. 31, 2008, Aug. 2008, Cooperative Agreement No. DE-FC26-04NT42314, 83 pages.

Blythe, "Field Testing of a Wet FGD Additive for Enhanced Mercury Control—Pilot-scale Test Results," Topical Report, May 2006, Cooperative Agreement No. DE-FC26-04NT42309, 51 pages.

Elliott et al., "Novel Mercury Control Strategy Utilizing Wet FGD in Power Plants Burning Low Chlorine Coal," Paper 93, Mega Symposium, Aug. 30 to Sep. 2, 2010, Baltimore, MD, 15 pages.

Omine et al., "Study of elemental mercury re-emission in a simulated wet scrubber," Fuel, 2012, 91, pp. 93-101.

Honjo et al., "SCR/Wet-FGD Mercury Removal Co-Benefits Improvement-5 MW Demonstration Test," Paper No. 7, Mega Symposium, Aug. 25 to 28, 2008, Baltimore, MD, 9 pages.

Technical literature for Ohio Lumex RP-915+, <http://www.eagle.msi.com/emsiftp/Ohio%20Lumex/M-324%20Attachment(ladle)%20with%20ramping1.pdf> 81 pages.

"National Emission Standards for Hazardous Air Pollutants from Coal- and Oil-fired Electric Utility Steam Generating Units and Standards of Performance for Fossil-Fuel-Fired Electric Utility, Industrial-Commercial-Institutional, and Small Industrial-Commercial-Institutional Steam Generating Units," 40 CFR Part 63, Environmental Protection Agency, www.regulations.gov, Dec. 16, 2011.

Charles E. Miller et al., "Mercury Capture and Fate Using Wet FGD at Coal-Fired Power Plants", DOE/NETL Mercury and Wet FGD R&D, pp. 1-37 (Aug. 2006).

Steven A. Benson et al., "Pilot- and Full-Scale Demonstration of Advanced Mercury Control Technologies for Lignite-Fired Power Plants", Final Report, (Feb. 2005).

William DePriest and Rajendra P. Gaikwad, "Economics of Lime and Limestone for Control of Sulfur Dioxide", pp. 1-25 (May 2003).

Sargent & Lundy, LLC, "Wet Flue Gas Desulfurization Technology Evaluation", Project No. 11311-000, Jan. 2003.

"Mercury Control Technologies for Coal-Based Power Plants", Mercury Control Technologies, Edison Electric Institute, Aug. 2005.

Gary M. Blythe and David W. DeBerry, PhD, "Bench-scale Kinetics Study of Mercury Reactions in FGD Liquors", Semiannual Technical Progress Report, Apr. 1, 2006-Sep. 30, 2006 (Oct. 2006).

J. Glater et al., "The search for a chlorine-resistant reverse osmosis membrane", Desalination, 95, 325-345 (1994).

S. Kang et al., "Preparation and Properties of Aromatic Polyamide Homologs Containing Chlorine Substituents", Journal of Applied Polymer Science, vol. 77, 1387-1392, (2000).

J. C. Alvarez et al., "Thermal and Mechanical Properties of Halogen-Containing Aromatic Polyamides", Macromol. Chern. Phys. vol. 202, 3142-3148 (2001).

* cited by examiner

METHODS OF CONTROLLING MERCURY EMISSION

CROSS-REFERENCE TO RELATED APPLICATIONS

This is a continuation-in-part of U.S. patent application Ser. No. 13/366,441, filed on Feb. 6, 2012 and is also a continuation-in-part of U.S. patent application Ser. No. 13/366,461, filed on Feb. 6, 2012 and is also a continuation-in-part of U.S. patent application Ser. No. 13/366,610, filed on Feb. 6, 2012 and is also a continuation-in-part of U.S. patent application Ser. No. 13/366,630, filed on Feb. 6, 2012, which are continuations-in-part of U.S. patent application Ser. No. 11/952,637, filed on Dec. 7, 2007, now U.S. Pat. No. 8,110,163, the contents of all of which are herein fully incorporated by reference.

TECHNICAL FIELD

The present disclosure relates generally to methods for controlling mercury emissions, and more particularly, to methods for controlling mercury re-emissions from wet flue gas desulfurizers.

BACKGROUND

The Environmental Protection Agency (EPA) recently published the Mercury and Air Toxics Rule (MATS Rule) that will require all electricity generating units (EGUs) that burn fossil fuels to reduce mercury emissions levels within the next three years. Many of these units currently use or will use wet flue gas desulfurizers (wFGDs) to meet acid gas or SOx emission limits. A wFGD contacts combustion gas with an aqueous alkaline solution, which solution may be composed of magnesium compounds, sodium compounds, and slurries of lime or limestone to capture and neutralize acid gases, such as sulfur dioxide. The aqueous alkaline solution is commonly referred to as "wFGD liquor" or "scrubber liquor." In a forced oxidation system, oxygen may be introduced into the wFGD liquor to oxidize sulfite to sulfate. In many cases, this forms gypsum (calcium sulfate), as the final byproduct of scrubbing. Other systems may utilize inhibited or natural oxidation scrubbing which results in sulfite salts or mixed sulfite/sulfate salts as byproduct.

Mercury entering EGUs as a contaminant of the fuel is released during combustion. Combustion gases exiting the boiler may contain mercury in three forms: particulate, oxidized, and elemental. Particulate mercury can be captured by particulate control devices such as electrostatic precipitators (ESPs) and fabric filters (FF). Oxidized mercury is water-soluble and as such wFGDs can absorb the oxidized mercury from the combustion gas into the liquid phase. Elemental mercury, which is insoluble in water, is difficult to capture using existing air quality control devices. Consequently, mechanical methods such as fixed bed catalysts (e.g., SCRs), and chemical additives (e.g., calcium bromide, hydrogen bromide, ammonium chloride) have been developed that oxidize elemental mercury in the gas phase for subsequent capture with a wFGD. The captured mercury leaves the process via wFGD blow down.

As oxidized mercury is water soluble, wFGDs are theoretically capable of capturing nearly 100% of the oxidized mercury in a combustion gas. However, data collected by the Department of Energy (DOE) as well as numerous laboratory and commercial studies have shown lower capture efficiencies. The lower efficiencies are the result of reduction of oxidized mercury to elemental mercury (e.g., $Hg^{2+}$ to)$Hg^0$ within the wFGD scrubber liquor. For example, one reduction reaction involves the oxidation of sulfite by ionic mercury in the wFGD to provide sulfate and elemental mercury. The result is an increase across the wFGD of elemental mercury content in the scrubbed combustion gas, and thus a decrease in total mercury capture as measured from fossil fuel to stack. This reduction of oxidized mercury in the scrubber and subsequent release is known in the industry as mercury re-emission. The loss in wFGD mercury capture efficiency due to mercury re-emission will prevent some EGUs from meeting the MATS Rule, necessitating installation of additional capital equipment.

Mercury re-emission is currently addressed with addition of sulfur-based additives, both organic and inorganic, or sulfur-based modified inorganics to chelate ionic mercury in the scrubber liquor, or through addition of absorbents such as activated carbon. In all these cases, the additive is introduced into the scrubber at an excess rate that has previously been shown to reduce re-emission. However, in none of these cases, have there been any development of control methodology that automatically controls the rate of addition of these re-emission control additives relative to normal operation. Variation in mercury concentration found in the fossil fuel, and therefore the combustion gas to be treated, results in periods of over and underfeeding of additive. Thus, in certain instances the lack of direct control results in overfeeding of the additives, which in turn leads to increased operating costs and higher waste generation.

There is a need in the art for methods of controlling the rate of addition of mercury re-emission control additives to provide the appropriate amount of additive to a scrubber without over- or underfeeding of additive.

SUMMARY

In one aspect, disclosed are methods for controlling mercury re-emission from a combustion gas. The method may include measuring either ionic mercury concentration, oxidation-reduction potential (ORP), and/or sulfide ion concentration within a scrubber liquor of a wet flue gas desulpherizer (wFGD); correlating the mercury concentration, ORP, and/or sulfide concentration with an amount of mercury re-emission additive required in the scrubber liquor to reduce and/or prevent mercury re-emission to a selected level; and adjusting the rate of addition of mercury re-emission control additive into the scrubber liquor to attain the selected level of mercury re-emission (e.g., a desired level of mercury re-emission to meet MATS limits).

In certain embodiments, ionic mercury concentration is measured, oxidation-reduction potential is measured, or sulfide ion concentration is measured. In certain embodiments, a combination of ionic mercury concentration, oxidation-reduction potential, and sulfide ion concentration are measured.

In certain embodiments, the rate of addition of mercury re-emission control additive is adjusted to reduce the scrubber liquor ionic mercury concentration to less than 500 ppt, or less than 200 ppt. In certain embodiments, the rate of addition of mercury re-emission control additive is adjusted to reduce the scrubber liquor ionic mercury concentration to less than 200 ppt and the percent mercury re-emission from the scrubber liquor to 10% or less. In certain embodiments, the rate of addition of mercury re-emission control additive is adjusted to reduce the scrubber liquor mercury concentration to less than 100 ppt and the percent mercury re-emission from the scrubber liquor to 1% or less.

In certain embodiments, the ORP value is measured, and the rate of addition of mercury re-emission control additive is adjusted to reduce the scrubber liquor oxidation-reduction potential by up to 100 mV. In certain embodiments, the ORP value is measured, and the rate of addition of mercury re-emission control additive is adjusted to reduce the scrubber liquor oxidation-reduction potential by up to 300 mV. In certain embodiments, the ORP value is measured, and the rate of addition of mercury re-emission control additive is adjusted to reduce the scrubber liquor oxidation-reduction potential by up to 400 mV.

In certain embodiments, the oxidation-reduction potential of the scrubber liquor is measured prior to adjusting the rate of addition of mercury re-emission control additive to provide a baseline ORP, wherein the rate of addition of mercury re-emission control additive is thereafter increased to reduce the scrubber liquor oxidation-reduction potential by 50-400 mV. In certain embodiments, the reduction of scrubber liquor oxidation-reduction potential by 50-400 mV reduces mercury re-emission to 20% mercury re-emission or less, 10% mercury re-emission or less, or 1% mercury re-emission or less.

In certain embodiments, the rate of addition of mercury re-emission control additive is adjusted to increase the scrubber liquor sulfide ion concentration to greater than 20 ppm, greater than 50 ppm, or greater than 70 ppm. In certain embodiments, the rate of addition of mercury re-emission control additive is adjusted to increase the scrubber liquor sulfide ion concentration to a range of about 20 ppm to about 100 ppm, or about 30 ppm to about 70 ppm.

In certain embodiments, the mercury re-emission control additive is a polydithiocarbamic compound. The mercury re-emission control additive may be an ethylene dichloride ammonia polymer having a molecular weight of from 500 to 10,000, and containing from 5 to 55 mole % of dithiocarbamate salt groups. Alternatively, the mercury re-emission control additive may be a composition comprising a polymer derived from at least two monomers: acrylic-x and an alkylamine, wherein said acrylic-x has the following formula:

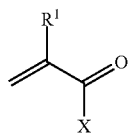

wherein X=OR, OH and salts thereof, or $NHR^2$ and wherein $R^1$ and $R^2$ is H or an alkyl or aryl group, wherein R is an alkyl or aryl group, wherein the molecular weight of said polymer is between 500 to 200,000, and wherein said polymer is modified to contain a functional group capable of scavenging one or more compositions containing one or more metals. The functional group may be a sulfur containing functional group.

In certain embodiments, measurement of mercury concentration, oxidation-reduction potential, and/or sulfide concentration is automated. In certain embodiments, adjustment of the rate of addition of mercury re-emission control additive is automated. In certain embodiments, measurement of mercury concentration, oxidation-reduction potential, and/or sulfide concentration is automated, and adjustment of the rate of addition of mercury re-emission control additive is automated. In certain embodiments, at least one of mercury concentration, oxidation-reduction potential, and sulfide concentration are continuously monitored.

The methods and processes are further described herein.

DETAILED DESCRIPTION

Figure 1A:
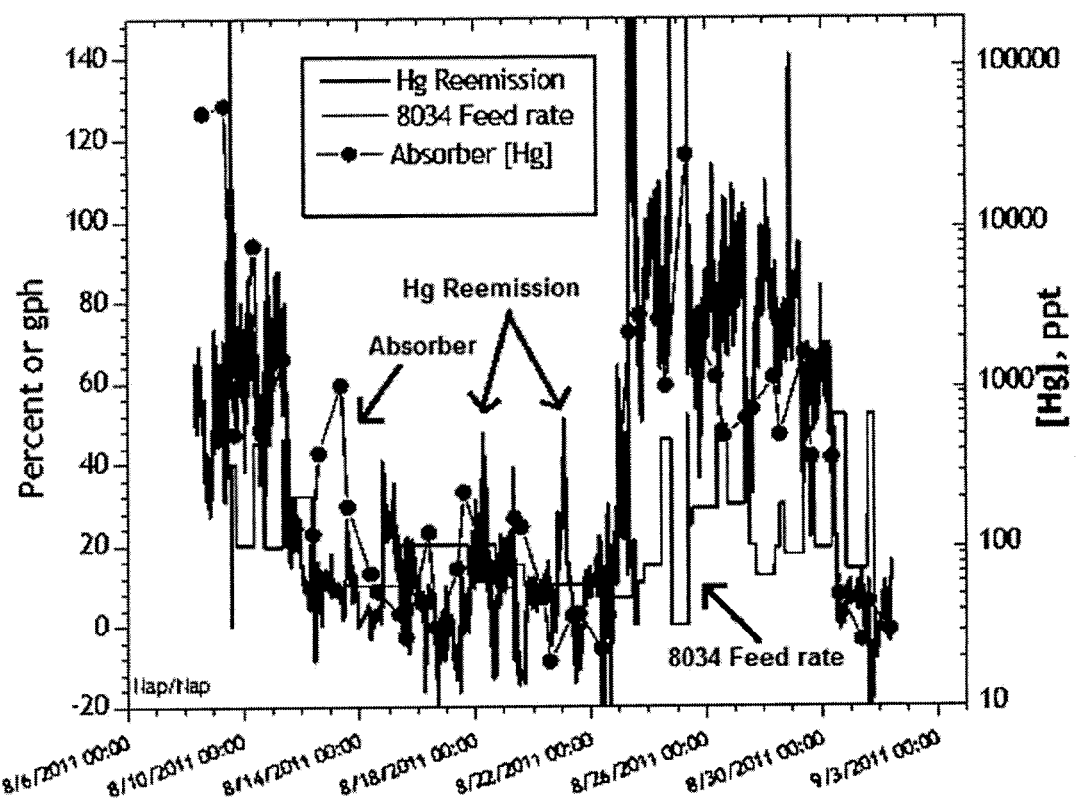
FIG. 1a depicts a percent mercury re-emission controlled by measuring mercury concentration and adjusting addition rate of a mercury re-emission control additive.

Disclosed herein are methods for controlling mercury emissions from a scrubber process. More particularly, the inventors have discovered a method of measuring ionic mercury concentration and/or oxidation-reduction potential (ORP) and/or sulfide ion concentration within a scrubber liquor of a wet flue gas desulpherizer (wFGD); correlating the mercury concentration and/or ORP and/or sulfide ion concentration with an amount of mercury re-emission additive required to reduce and/or prevent mercury re-emission; and thereafter appropriately adjusting the rate of addition of mercury re-emission control additive into the scrubber liquor. The methods disclosed herein provide process efficiency and economic advantages over conventional methods of reducing mercury re-emission.

The methods disclosed herein also provide continuous, in-line monitoring of mercury re-emissions and allow for automatic adjustment of the rate of addition of mercury re-emission control additive to compensate for changes in fuel composition and/or scrubber liquor composition. The measurement of ionic mercury concentration, oxidation-reduction potential, and/or sulfide ion concentration may be automated, and the resulting measurement(s) used to automatically and in real-time adjust the rate of addition of mercury re-emission control additive. The methods disclosed herein therefore reduce the incidence of over- and underfeeding of additive to the scrubber liquor.

1. Definition of Terms

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used in the specification and the appended claims, the singular forms "a," "and" and "the" include plural references unless the context clearly dictates otherwise. The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of" and "consisting essentially of," the embodiments or elements presented herein, whether explicitly set forth or not.

The term "percent mercury re-emission", as used herein, refers to:

$$\% \text{ Hg Re-emission} = \left( \frac{Hg^\circ_{outlet} - Hg^\circ_{inlet}}{Hg^T_{Inlet} - Hg^\circ_{Inlet}} \right) \times 100 \quad \text{Equation 1}$$

where "outlet" refers to EGU stack gas mercury measurement, "inlet" refers to gas concentrations at the inlet to the wFGD, "0" refers to the concentration of elemental mercury in the gas, and "T" refers to the total concentration of mercury in the gas. The "outlet" measurement may refer to mercury gas measurements made at any location after the gas has exited the wFGD.

The term "percent mercury oxidation", as used herein, refers to:

$$\% \text{ Hg Oxidation} = \left( \frac{Hg^T_{inlet} - Hg^\circ_{inlet}}{Hg^T_{Inlet}} \right) \times 100 \quad \text{Equation 2}$$

where the super- and sub-scripts have the same meaning as defined in Equation 1 above.

The term "percent mercury capture", as used herein, refers to:

$$\% \text{ Hg Capture} = \left( \frac{Hg^T_{Inlet} - Hg^T_{outlet}}{Hg^T_{Inlet}} \right) \times 100 \quad \text{Equation 3}$$

where the super- and sub-scripts have the same meaning as defined in Equation 1 above.

The term "oxidation-reduction potential", as used herein, refers to the summation of all the oxidation and reduction potentials in a given solution or scrubber liquor. As such, the oxidation-reduction potential varies depending on a liquor composition.

2. Methods of Controlling Mercury Emission

The methods disclosed relate to controlling the rate of addition of mercury re-emission control additives to wet flue gas desulpherizers. The rate of addition may be adjusted based on either ionic mercury concentration in the wFGD scrubber liquor, changes in the wFGD scrubber liquor oxidative reduction potential, and/or sulfide ion concentration in the wFGD scrubber liquor.

In certain embodiments, the ionic mercury concentration in a scrubber liquor may be measured, and the rate of addition of mercury re-emission control additive increased to reduce the ionic mercury concentration, thereby reducing the percent mercury re-emission from the scrubber liquor. In certain embodiments, the ionic mercury concentration of a scrubber liquor may be measured, and the rate of addition of mercury re-emission control additive decreased while maintaining an ionic mercury concentration, thereby maintaining the percent mercury re-emission from the scrubber liquor without using excess mercury re-emission control additive.

In certain embodiments, the oxidation-reduction potential of a scrubber liquor may be measured, and the rate of addition of mercury re-emission control additive increased to reduce the ORP, thereby reducing the percent mercury re-emission from the scrubber liquor. In certain embodiments, the oxidation-reduction potential of a scrubber liquor may be measured, and the rate of addition of mercury re-emission control additive decreased to increase the ORP to an acceptable level to maintain the percent mercury re-emission from the scrubber liquor without using excess mercury re-emission control additive.

In certain embodiments, the sulfide ion concentration in a scrubber liquor may be measured, and the rate of addition of mercury re-emission control additive increased to increase the sulfide concentration, thereby reducing the percent mercury re-emission from the scrubber liquor. In certain embodiments, the sulfide concentration of a scrubber liquor may be measured, and the rate of addition of mercury re-emission control additive decreased to decrease the sulfide concentration while maintaining a percent mercury re-emission from the scrubber liquor without using excess mercury re-emission control additive.

In certain embodiments, any combination of ionic mercury concentration, oxidation-reduction potential, and sulfide ion concentration may be used to monitor the scrubber liquor and guide adjustment of the addition rate of mercury re-emission control additive. In one preferred embodiment, all of ionic mercury concentration, oxidation-reduction potential, and sulfide ion concentration are monitored and used together to guide adjustment of the rate of addition of mercury re-emission control additive.

In certain embodiments, monitoring of the scrubber liquor composition and subsequent adjustment of the rate of addition of mercury re-emission control additive may be automated. For example, the ionic mercury concentration, the oxidation-reduction potential, and/or the sulfide ion concentration may be monitored by an automated process, and depending on the measured value(s), the rate of addition of mercury re-emission control additive may be automatically adjusted in real time to compensate for changes in the fuel, plant load, and/or scrubber liquor composition, thereby continuously maintaining a desired mercury re-emission level without over- or under feeding the wFGD with mercury re-emission control additive.

a. Mercury Concentration

Mercury concentration in a scrubber liquor can be used to monitor wFGD operations, and the rate of addition of mercury re-emission control additive can be adjusted accordingly to adjust mercury capture. In certain embodiments, the rate of addition of mercury re-emission control additive can be increased to compensate for higher concentrations of ionic mercury in the scrubber liquor, thereby reducing mercury re-emission. In certain embodiments, the rate of addition of mercury re-emission control additive can be decreased to compensate for lower concentrations of ionic mercury in the scrubber liquor, thereby reducing excessive use of re-emission control additive.

The addition rate of the mercury re-emission additive may be selected based on the measured concentration of ionic mercury in the scrubber liquor. In certain embodiments, the percent mercury re-emission from the scrubber liquor can be reduced by adjusting the rate of addition of mercury re-emission control additive such that the scrubber liquor ionic mercury concentration is reduced to 1000 parts per trillion (ppt) or less, 900 ppt or less, 800 ppt or less, 700 ppt or less, 600 ppt or less, 500 ppt or less, 400 ppt or less, 300 ppt or less, 250 ppt or less, 200 ppt or less, 150 ppt or less, 100 ppt or less, or 50 ppt or less. In certain embodiments, the percent mercury re-emission from the scrubber liquor can be reduced by adjusting the rate of addition of mercury re-emission control additive such that the scrubber liquor ionic mercury concentration ranges from about 0 ppt to about 1000 ppt, from about 5 ppt to about 900 ppt, from about 10 to about 800 ppt, from about 15 ppt to about 700 ppt, from about 20 ppt to about 600 ppt, from about 25 ppt to about 500 ppt, from about 30 ppt to about 400 ppt, from about 35 ppt to about 300 ppt, from about 40 ppt to about 250 ppt, from about 45 ppt to about 200 ppt, or from about 50 ppt to about 150 ppt.

The percent mercury re-emission may be reduced to 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, at ionic mercury concentration levels less than 200 ppt, mercury re-emission may be reduced to zero or near zero.

In certain embodiments, an ionic mercury scrubber liquor concentration of 1000 ppt or less may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, an ionic mercury scrubber liquor concentration of 900 ppt or less may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, an ionic mercury scrubber liquor concentration of 800 ppt or less may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, an ionic mercury scrubber liquor concentration of 700 ppt or less may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, an ionic mercury scrubber liquor concentration of 600 ppt or less may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, an ionic mercury scrubber liquor concentration of 500 ppt or less may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, an ionic mercury scrubber liquor concentration of 400 ppt or less may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, an ionic mercury scrubber liquor concentration of 300 ppt or less may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, an ionic mercury scrubber liquor concentration of 250 ppt or less may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, an ionic mercury scrubber liquor concentration of 200 ppt or less may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, an ionic mercury scrubber liquor concentration of 150 ppt or less may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, an ionic mercury scrubber liquor concentration of 100 ppt or less may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, an ionic mercury scrubber liquor concentration of 50 ppt or less may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%.

In certain embodiments, the addition rate of the mercury re-emission additive may be adjusted based on targeting a scrubber liquor ionic mercury concentration of 1000 ppt or less, 900 ppt or less, 800 ppt or less, 700 ppt or less, 600 ppt or less, 500 ppt or less, 400 ppt or less, 300 ppt or less, 250 ppt or less, 200 ppt or less, 150 ppt or less, 100 ppt or less, or 50 ppt or less. The feed of the scrubber additive may then be controlled to maintain a selected level of mercury scrubber liquor concentration during process variations, such as load and coal changes. Hence, active control can be set to follow plant load, changes in flue gas mercury content due to fuel changes, and scrubber liquor changes.

In certain embodiments, the rate of addition of mercury re-emission control additive to a scrubber liquor may provide an additive concentration from about 0.0001 ppm to about 50,000 ppm, or from about 0.01 ppm to about 5,000 ppm. The rate of addition of mercury re-emission control additive may be adjusted to target a selected scrubber liquor ionic mercury concentration, and in turn a desired mercury re-emissions level. Factors that affect addition rate besides concentration include coal composition which includes but is not limited to mercury and sulfur concentration of the coal; halogen content of the coal; the type of fuel (e.g., anthracite, lignite, bituminous or subbituminous); the megawatt size of the plant (e.g., 100 to 1000 MW), or capacity of the plant; the presence of other air quality control devices ahead of the scrubber such as fabric filters or electrostatic precipitators; the application of other flue gas mercury reduction technologies such as activated carbon or inorganic sorbents prior to the scrubber; the design type of the scrubber, (e.g., spray tower, chiota also known as a jet bubbler, or horizontal type); the scrubber liquor volume; blow down rate (i.e., the rate at which spent liquor is removed from the scrubber); liquid to gas ratio used in the scrubber; the presences of trays or liquor dispersion techniques such as trays or baffles; the particle size and concentration of lime or limestone being added to the scrubber to neutralize acid gases; the load or demand (i.e., the percent of maximum generating load of the plant); the quality of the water (e.g., concentration of impurities such as cations and anions as well as process byproducts when water is reclaimed from cooling tower blow down); and the relative amount of oxygen introduced into the scrubber slurry for forced oxidation systems.

b. Oxidation-Reduction Potential

Oxidation-reduction potential (ORP) of a scrubber liquor can be monitored as related to mercury capture, and the rate of addition of mercury re-emission control additive can be adjusted accordingly. By reducing the scrubber liquor ORP through addition of mercury re-emission control additives, mercury re-emissions can be reduced, optionally to zero, and controlled directly based on the ORP of the treated wFGD liquor. These results are particularly surprising considering that conventional methods of controlling mercury re-emission rely on increasing the existing scrubber liquor ORP to more positive or more oxidizing in order to stabilize ionic mercury species in solution.

Although not wishing to be bound by theory, it is believed that addition of mercury re-emission control additives results in the complexation of ionic mercury in the scrubber liquor, thereby reducing mercury re-emission. In so doing, the scrubber liquor ORP moves in a more negative direction and becomes more reducing as ionic mercury is removed from the scrubber liquor via complexation with control additive. Moving the scrubber liquor ORP toward a more reducing condition is counter intuitive when faced with stabilizing oxidized mercury in the liquor.

The scrubber liquor baseline ORP may vary widely due to variations in composition. Such variations are influenced by, for example, EGU operations, fuel composition, boiler additives, supplemental oxidants, and scrubber additives used to enhance sulfur capture efficiency. Hence, the starting ORP of the scrubber liquor may vary from, for example, oxidative at +400 mV to slightly oxidative at +90 mV. Preferably, the mercury re-emission control additives used with the methods of the invention decrease the liquor ORP, leading to reduction in mercury re-emissions.

The addition rate of mercury re-emission control additive may be selected based on the measured concentration ORP of the scrubber liquor or a targeted ORP value of the scrubber liquor relative to baseline. In certain embodiments, the percent mercury re-emission from the scrubber liquor can be reduced by adjusting the rate of addition of mercury re-emission control additive such that the scrubber liquor ORP is reduced by a value of 500 mV or less, 400 mV or less, 300 mV or less, 250 mV or less, 200 mV or less, 150 mV or less, 100 mV or less, or 50 mV or less. In certain embodiments, the percent mercury re-emission from the scrubber liquor can be reduced by adjusting the rate of addition of mercury re-emission control additive such that the scrubber liquor ORP reduction ranges from about 50 mV to about 500 mV, about 100 mV to about 300 mV, or about 150 mV to about 250 mV. In certain embodiments, the value of ORP change may be greater than 50 mV, greater than 100 mV, greater than 150 mV, greater than 200 mV, greater than 250 mV, greater than 300 mV, greater than 350 mV, greater than 400 mV, greater than 450 mV, or greater than 500 mV.

The percent mercury re-emission may be reduced to 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%.

In certain embodiments, a reduction in ORP of 50 mV or greater may correspond to a percent mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, a reduction in ORP of 100 mV or greater may correspond to a percent mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, a reduction in ORP of 150 mV or greater may correspond to a percent mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, a reduction in ORP of 200 mV or greater may correspond to a percent mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, a reduction in ORP of 250 mV or greater may correspond to a percent mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, a reduction in ORP of 300 mV or greater may correspond to a percent mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, a reduction in ORP of 350 mV or greater may correspond to a percent mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, a reduction in ORP of 400 mV or greater may correspond to a percent mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, a reduction in ORP of 450 mV or greater may correspond to a percent mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, a reduction in ORP of 500 mV or greater may correspond to a percent mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%.

In certain embodiments, the scrubber liquor ORP may be continuously monitored or monitored at intervals, wherein if the measured ORP increases by 50 mV or more, 100 mV or more, 150 mV or more, 200 mV or more, 250 mV or more, 300 mV or more, 400 mV or more, or 500 mV or more over a desired ORP, the rate of addition of mercury re-emission control additive may be increased to reduce the scrubber liquor ORP by 50 mV or more, 100 mV or more, 150 mV or more, 200 mV or more, 250 mV or more, 300 mV or more, or 400 mV or more. The reduction in scrubber liquor ORP may result in a percent mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%.

In certain embodiments, the scrubber liquor ORP may be continuously monitored or monitored at intervals, wherein if the measured ORP decreases by 50 mV or more, 100 mV or more, 150 mV or more, 200 mV or more, 250 mV or more, 300 mV or more, 400 mV or more, or 500 mV or more below the desired ORP, the rate of addition of mercury re-emission control additive may be decreased to increase scrubber liquor ORP by 50 mV or more, 100 mV or more, 150 mV or more, 200 mV or more, 250 mV or more, 300 mV or more, 400 mV or more, or 500 mV or more. Preferably, when the scrubber liquor ORP is increased by reducing the rate of addition of mercury re-emission control additive, the percent mercury re-emission is maintained at or near a level reached before increasing the scrubber liquor ORP.

In certain embodiments, the rate of addition of mercury re-emission control additive to a scrubber liquor may provide an additive concentration from about 0.0001 ppm to about 50,000 ppm, or from about 0.01 ppm to about 5,000 ppm. The rate of addition of mercury re-emission control additive may be adjusted to target a selected change in oxidation-reduction potential, and in turn a desired mercury re-emissions level. Factors that affect addition rate besides concentration include coal composition which includes but is not limited to mercury and sulfur concentration of the coal; halogen content of the coal; the type of fuel (e.g., anthracite, lignite, bituminous or subbituminous); the megawatt size of the plant (e.g., 100 to 1000 MW), or capacity of the plant; the presence of other air quality control devices ahead of the scrubber such as fabric filters or electrostatic precipitators; the application of other flue gas mercury reduction technologies such as activated carbon or inorganic sorbents prior to the scrubber; the design type of the scrubber, (e.g., spray tower, chiota also known as a jet bubbler, or horizontal type); the scrubber liquor volume; blow down rate (i.e., the rate at which spent liquor is removed from the scrubber); liquid to gas ratio used in the scrubber; the presences of trays or liquor dispersion techniques such as trays or baffles; the particle size and concentration of lime or limestone being added to the scrubber to neutralize acid gases; the load or demand (i.e., the percent of maximum generating load of the plant); the quality of the water (e.g., concentration of impurities such as cations and anions as well as process byproducts when water is reclaimed from cooling tower blow down); and the relative amount of oxygen introduced into the scrubber slurry for forced oxidation systems.

c. Sulfide Concentration

Sulfide concentration in a scrubber liquor can be used to monitor wFGD operations, and the rate of addition of mercury re-emission control additive can be adjusted accordingly to adjust mercury capture. Using sulfide concentration to monitor wFGD operations provides an in-line, continuous, and direct means of measuring the re-emission control additive used to control mercury re-emission across the wFGD scrubber. In certain embodiments, the rate of addition of mercury re-emission control additive can be increased to compensate for lower concentrations of sulfide in the scrubber liquor, thereby reducing mercury re-emission. In certain embodiments, the rate of addition of mercury re-emission control additive can be decreased to compensate for higher concentrations of sulfide in the scrubber liquor, thereby reducing excessive use of re-emission control additive.

A sulfide ion-selective electrode (ISE) can be used to monitor sulfide concentration. The sulfide ion-selective electrode may be designed for the detection of sulfide ions ($S^{-2}$) in aqueous solutions, and may be suitable for use in both field and laboratory applications. The sulfide ion-selective electrode may have a solid-state crystal membrane. Where the mercury re-emission control additive contains sulfide ions, the sulfide ion-selective electrode can be used to monitor and control the additive feed rate and dosage to a wFGD.

The addition rate of the mercury re-emission control additive may be selected based on the measured concentration of sulfide in the scrubber liquor. In certain embodiments, the percent mercury re-emission from the scrubber liquor can be reduced by adjusting the rate of addition of mercury re-emission control additive such that the scrubber liquor sulfide concentration is increased to 20 ppm or greater, 30 ppm or greater, 40 ppm or greater, 50 ppm or greater, 60 ppm or greater, 70 ppm or greater, 80 ppm or greater, 90 ppm or greater, or 100 ppm or greater. In certain embodiments, the percent mercury re-emission from the scrubber liquor can be reduced by adjusting the rate of addition of mercury re-emission control additive such that the scrubber liquor sulfide concentration ranges from about 100 ppm or less, 90 ppm or less, 80 ppm or less, 70 ppm or less, 60 ppm or less, 50 ppm or less, 40 ppm or less, 30 ppm or less, or 20 ppm or less. The sulfide concentration may be determined using a sulfide ion-selective electrode and correlating the measured electrode response to sulfide concentration.

The percent mercury re-emission may be reduced to 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, at sulfide levels of 20 ppm or greater, 30 ppm or greater, 40 ppm or greater, 50 ppm or greater, 60 ppm or greater, 70 ppm or greater, 80 ppm or greater, 90 ppm or greater, or 100 ppm or greater, mercury re-emission may be reduced to zero or near zero.

In certain embodiments, a sulfide scrubber liquor concentration of 20 ppm or greater may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, a sulfide scrubber liquor concentration of 30 ppm or greater may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, a sulfide scrubber liquor concentration of 40 ppm or greater may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, a sulfide scrubber liquor concentration of 50 ppm or greater may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, a sulfide scrubber liquor concentration of 60 ppm or greater may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, a sulfide scrubber liquor concentration of 70 ppm or greater may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, a sulfide scrubber liquor concentration of 80 ppm or greater may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, a sulfide scrubber liquor concentration of 90 ppm or greater may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%. In certain embodiments, a sulfide scrubber liquor concentration of 100 ppm or greater may correspond to a mercury re-emission of 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, 1% or less, or 0%.

In certain embodiments, the addition rate of the mercury re-emission additive may be adjusted based on targeting a scrubber liquor sulfide concentration of about 20 ppm to about 100 ppm, or about 30 ppm to about 70 ppm. The feed of the scrubber additive may then be controlled to maintain the selected level of sulfide concentration during process variations, such as load and coal changes. Hence, active control can be set to follow plant load, changes in flue gas mercury content due to fuel changes, and scrubber liquor changes.

In certain embodiments, the rate of addition of mercury re-emission control additive to a scrubber liquor may provide an additive concentration from about 0.0001 ppm to about 50,000 ppm, or from about 0.01 ppm to about 5,000 ppm. The rate of addition of mercury re-emission control additive may be adjusted to target a selected scrubber liquor sulfide ion concentration, and in turn a desired mercury re-emissions level. Factors that affect addition rate besides concentration include coal composition which includes but is not limited to mercury and sulfur concentration of the coal; halogen content of the coal; the type of fuel (e.g., anthracite, lignite, bituminous or subbituminous); the megawatt size of the plant (e.g., 100 to 1000 MW), or capacity of the plant; the presence of other air quality control devices ahead of the scrubber such as fabric filters or electrostatic precipitators; the application of other flue gas mercury reduction technologies such as activated carbon or inorganic sorbents prior to the scrubber; the design type of the scrubber, (e.g., spray tower, chiota also known as a jet bubbler, or horizontal type); the scrubber liquor volume; blow down rate (i.e., the rate at which spent liquor is removed from the scrubber); liquid to gas ratio used in the scrubber; the presences of trays or liquor dispersion techniques such as trays or baffles; the particle size and concentration of lime or limestone being added to the scrubber to neutralize acid gases; the load or demand (i.e., the percent of maximum generating load of the plant); the quality of the water (e.g., concentration of impurities such as cations and anions as well as process byproducts when water is reclaimed from cooling tower blow down); and the relative amount of oxygen introduced into the scrubber slurry for forced oxidation systems.

3. Mercury Re-Emission Control Additives

Mercury re-emission control additives that can be used with the methods of the invention include any additive suitable to reduce and/or prevent mercury re-emission from combustion processes, and in particular, scrubber liquors.

In certain embodiments, the mercury re-emission control additive may be a poly-dithiocarbamic compound (e.g., Mer-Control 8034, also referred to herein as "poly-DTC"), or another sulfur-containing additive such as sodium sulfide, sodium hydrosulfide, sodium bisulfide, or a poly-sulfide.

In certain embodiments, the mercury re-emission control additive may be diethyldithiocarbamate or a sodium salt thereof. In certain embodiments, the mercury re-emission control additive may be dimethyldithiocarbamate or a sodium salt thereof.

In certain embodiments, the mercury re-emission control additive may be an inorganic poly-sulfide or blend, such as PRAVO, a product from Vosteen.

In certain embodiments, the mercury re-emission additive may be a sodium or calcium salt of 1,3,5-triazine-2,4,6(1H, 3H,5H)-trithione (also referred to as trimercapto-S-triazine), such as TMT-15, a product from Degussa.

In certain embodiments, the mercury re-emission control additive may be an activated carbon, such as disclosed in U.S. Pat. No. 7,727,307 B2.

In certain embodiments, the mercury re-emission control additive may be a dithiol, a dithiolane, or a thiol having a single thiol group and either an oxygen or a hydroxyl group. Suitable dithiols include, but are not limited to, 2,3-dimercaptopropanol, dimercaptosuccinic acid, and 1,8-octanedithiol. Suitable dithiolanes include, but are not limited to, 1,2-dithiolane-3-valeric acid and 2-methyl 1,3-dithiolane. Suitable thiols include, but are not limited to, mercaptoacetic acid and sodium salts thereof.

In certain embodiments, a combination of mercury re-emission controlled additives may be used. In one preferred embodiment, the mercury re-emission control additive comprises a poly-dithiocarbamic compound.

a. Ethylene Dichloride Ammonia Polymer Containing Dithiocarbamate Groups

The mercury re-emission control additive may be a water-soluble ethylene dichloride ammonia polymer having a molecular weight of from 500 to 10,000, and containing from 5 to 55 mole % of dithiocarbamate salt groups to prevent re-emission of mercury across a wFGD.

The polymer may be prepared by the reaction of ethylene dichloride and ammonia to provide a polyamine or polyimine. The polyamine or polyimine may have a molecular weight range of 500-100,000. In a preferred embodiment, the molecular weight may be 1,500 to 10,000, with the most preferred molecular weight range being 1,500 to 5,000.

The dithiocarbamate groups of the polymers may be introduced by the reaction of the polyamines or polyimines with carbon disulfide to produce polydithiocarbamic acid or their salts. Such reaction is preferably carried out in a solvent such as water or alcohol at a temperature of from 30° C. and 100° C. for periods of time ranging between 1 and 10 hours. Good conversion may be obtained at temperatures between 40° and 70° C. for 2 to 5 hours.

The mole % of dithiocarbamate salt groups in the finished polymer may be within the range of 5 to 55%, 20 to 40 mole %, or 25 to 30 mole %. The salts include, but are not limited to, alkaline and alkali earth such as sodium, lithium, potassium or calcium.

The finished polymer may be applied to a combustion process at a ratio of 1:1 to 2000:1 weight copolymer to weight of mercury being captured. One preferred ratio may be from 5:1 to 1000:1 more preferably from 5:1 to 500:1.

b. Acrylic-x and Alkylamine Polymer

The mercury re-emission control additive may be a composition comprising a polymer derived from at least two monomers: acrylic-x and an alkylamine, wherein said acrylic-x has the following formula:

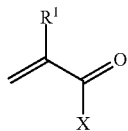

wherein X=OR, OH and salts thereof, or $NHR^2$ and wherein $R^1$ and $R^2$ is H or an alkyl or aryl group, wherein R is an alkyl or aryl group, wherein the molecular weight of said polymer is between 500 to 200,000, and wherein said polymer is modified to contain a functional group capable of scavenging one or more compositions containing one or more metals.

The metals can include zero valent, monovalent, and multivalent metals. The metals may or may not be ligated by organic or inorganic compounds. Also, the metals can be radioactive and nonradioactive. Examples include, but are not limited to, transition metals and heavy metals. Specific metals can include, but are not limited to: copper, nickel, zinc, lead, mercury, cadmium, silver, iron, manganese, palladium, platinum, strontium, selenium, arsenic, cobalt and gold.

The molecular weight of the polymers can vary. For example, the target species/application for the polymers can be one consideration. Another factor can be monomer selection. Molecular weight can be calculated by various means known to those of ordinary skill in the art. For example, size exclusion chromatography, as discussed in the examples below can be utilized. When molecular weight is mentioned, it is referring to the molecular weight for the unmodified polymer, otherwise referred to as the polymer backbone. The functional groups that are added to the backbone are not part of the calculation. Thus the molecular weight of the polymer with the functional groups can far exceed the molecular weight range. In one embodiment, the molecular weight of the polymer is from 1,000 to 16,000. In another embodiment, the molecular weight of said polymer is from 1,500 to 8,000.

Various functional groups can be utilized for metal scavenging. The following phraseology would be well understood by one of ordinary skill in the art: wherein said polymer is modified to contain a functional group capable of scavenging one or more compositions containing one or more metals. More specifically, the polymer is modified to contain a functional group that can bind metals. In one embodiment, the functional group contains a sulfide containing chemistry. In another embodiment, the functional group is a dithiocarbamate salt group. In another embodiment, the functional groups are at least one of the following: alkylene phosphate groups, alkylene carboxylic acids and salts thereof, oxime groups, amidooxime groups, dithiocarbamic acids and salts thereof, hydroxamic acids, and nitrogen oxides.

The molar amounts of the functional group relative to the total amines contained in the unmodified polymer can vary as well. For example, the reaction of 3.0 molar equivalents of carbon disulfide to a 1.0:1.0 mole ratio acrylic acid/TEPA copolymer, which contains 4 molar equivalents of amines per repeat unit after polymerization, will result in a polymer that is modified to contain 75 mole % dithiocarbamate salt group. In other words, 75% of the total amines in the unmodified polymer have been converted to dithiocarbamate salt groups.

In one embodiment, the polymer may have between 5 to 100 mole % of the dithiocarbamate salt group. In a further embodiment, the polymer has from 25 to 90 mole % of the dithiocarbamate salt group. In yet a further embodiment, the polymer has from 55 to 80 mole % of the dithiocarbamate salt group.

Monomer selection will depend on the desired polymer. In one embodiment, the alkylamine is at least one of the following: an ethyleneamine, a polyethylenepolyamine, ethylenediamine (EDA), diethylenetriamine (DETA), triethylenetetraamine (TETA) and tetraethylenepetamine (TEPA) and pentaethylenehexamine (PEHA). In another embodiment, the acrylic-x is at least one of the following: methyl acrylate, methyl methacrylate, ethyl acrylate, and ethyl methacrylate, propyl acrylate, and propyl methacrylate. In another embodiment, the acrylic-x is at least one of the following: acrylic acid and salts thereof, methacrylic acid and salts thereof, acrylamide, and methacrylamide.

The molar ratio between monomers that make up the polymer, especially acrylic-x and alkylamine can vary and depend upon the resultant polymer product that is desired. The molar ratio used is defined as the moles of acrylic-x divided by the moles of alkylamine. In one embodiment, the molar ratio between acrylic-x and alkylamine is from 0.85 to 1.5. In another embodiment, the molar ratio between acrylic-x and alkylamine is from 1.0 to 1.2. Various combinations of acrylic-x and alkylamines are encompassed by this invention as well as associated molecular weight of the polymers.

In one embodiment, the acrylic-x is an acrylic ester and the alkylamine is PEHA or TEPA or DETA or TETA or EDA. In a further embodiment, the molar ratio between acrylic-x and alkylamine is from 0.85 to 1.5. In yet a further embodiment, the molecular weight can encompass ranges: 500 to 200,000, 1,000 to 16,000, or 1,500 to 8,000. In yet a further embodiment, the acrylic ester can be at least one of the following: methyl acrylate, methyl methacrylate, ethyl acrylate, and ethyl methacrylate, propyl acrylate, and propyl methacrylate, which is combined with at least one of the alklyamines, which includes PEHA or TEPA or DETA or TETA or EDA. In yet a further embodiment, the resulting polymer is modified to contain the following ranges of dithiocarbamate salt groups: 5 to 100 mole %, 25 to 90 mole %, or 55 to 80 mole %.

In another embodiment, the acrylic-x is an acrylic amide and the alkylamine is TEPA or DETA or TETA or EDA. In a further embodiment, the molar ratio between acrylic-x and alkylamine is from 0.85 to 1.5. In yet a further embodiment, the molecular weight can encompass ranges: 500 to 200,000, 1,000 to 16,000, or 1,500 to 8,000. In yet a further embodiment, the acrylic amide can be at least one or a combination of acrylamide and methacrylamide, which is combined with at least one of the alklyamines, which includes PEHA or TEPA or DETA or TETA or EDA. In yet a further embodiment, the resulting polymer is modified to contain the following ranges of dithiocarbamate salt groups: 5 to 100 mole %, 25 to 90 mole %, or 55 to 80 mole %.

In another embodiment, the acrylic-x is an acrylic acid and salts thereof and the alkylamine is PEHA or TEPA or DETA or TETA or EDA. In a further embodiment, the molar ratio between acrylic-x and alkylamine is from 0.85 to 1.5. In yet a further embodiment, the molecular weight can encompass ranges: 500 to 200,000, 1,000 to 16,000, or 1,500 to 8,000. In yet a further embodiment, the acrylic acid can be at least one or a combination of acrylic acid or salts thereof and methacrylic acid or salts thereof, which is combined with at least one of the alklyamines, which includes TEPA or DETA or TETA or EDA. In yet a further embodiment, the resulting polymer is modified to contain the following ranges of dithiocarbamate salt groups: 5 to 100 mole %, 25 to 90 mole %, or 55 to 80 mole %.

Additional monomers can be integrated into the polymer backbone made up of constituent monomers acrylic-x and alkylamine. A condensation polymer reaction scheme can be utilized to make the basic polymer backbone chain. Various other synthesis methods can be utilized to functionalize the polymer with, for example, dithiocarbamate and/or other non-metal scavenging functional groups. One of ordinary skill in the art can functionalize the polymer without undue experimentation.

In certain embodiments, the composition can be formulated with other polymers such as those disclosed in U.S. Pat. No. 5,164,095, herein incorporated by reference, specifically, a water soluble ethylene dichloride ammonia polymer having a molecular weight of from 500 to 100,000 which contains from 5 to 55 mole % of dithiocarbamate salt groups. In one embodiment, the molecular weight of the polymer is from 1,500 to 10,000 and contains 15 to 50 mole % of dithiocarbamate salt groups. In a preferred embodiment, the molecular weight of the polymer is from 1,500 to 5,000 and contains 30 to 55 mole % of dithiocarbamate salt groups.

In certain embodiments, the composition can be formulated with other small molecule sulfide precipitants such as sodium sulfide, sodium hydrosulfide, TMT-15® (sodium or calcium salts of trimercapto-S-triazine), dimethyldithiocarbamate, and/or diethyldithiocarbamate.

c. Dosage

The dosage of the disclosed mercury re-emission control additives may vary as necessitated to reduce or prevent mercury re-emission. The dosage amounts can be selected based on a desired ionic mercury concentration, change in ORP, and/or sulfide concentration in the scrubber liquor, which correspond to a percent mercury re-emission.

Process medium quality and extent of process medium treatment are a couple of factors that can be considered by one of ordinary skill in the art in selecting dosage amount. A jar test analysis is a typical example of what is utilized as a basis for determining the amount of dosage required to achieve effective metals removal in the context of a process water medium, e.g. wastewater.

In one embodiment, the amount of mercury re-emission control additive for effectively removing metals from contaminated waters may be within the range of 0.2 to 2 moles of dithiocarbamate per mole of metal, or 1 to 2 moles of dithiocarbamate per mole of metal contained in the water. According to one embodiment, the dosage of metal removal polymer required to chelate and precipitate 100 ml of 18 ppm soluble copper to about 1 ppm or less was 0.011 gm (11.0 mg) of polymer. The metal polymer complexes formed are self-flocculating and quickly settle. These flocculants are easily separated from the treated water.

In the context of applying the polymer to a gas system, such as a flue gas, the polymer can be dosed incrementally and capture rates for a particular metal, e.g. such as mercury, can be calculated by known techniques in the art. In certain embodiments, a mercury re-emission control additive, such as a water-soluble ethylene dichloride ammonia polymer with dithiocarbamate salt groups, may be applied to a scrubber liquor at a ratio of 1:1 to 2000:1 weight of polymer to weight of mercury being captured. One preferred dosage ratio is from 5:1 to 1000:1, more preferably from 5:1 to 500:1.

4. Applications

Methods of the present invention can be used in any process in which it is desirable to remove mercury from a flue gas. For example, the methods of the present invention can be used in waste incineration plants (e.g., domestic waste, hazardous waste, or sewage sludge incineration plants), power stations (e.g., bituminous coal-fired, or lignite-fired power stations), other plants for high-temperature processes (e.g., cement burning), and high-temperature plants co-fired with waste or combined (multistage) high-temperature plants (e.g., power stations or cement rotary kilns having an upstream waste pyrrolysis or waste gasification). In certain embodiments, the sulfide ion-selective electrode may be used in wastewater treatment for dosage control of metals scavenging polymers.

Methods of the present invention can be used in processes of any dimension. The methods can be used in processes having a flue gas volumetric flow rate of $15 \times 10^3$ m$^3$ S.T.P. db/h, for example for sewage sludge incineration, or of $50 \times 10^3$ m$^3$ S.T.P. db/h, for example in hazardous waste incineration plants, or of $150 \times 10^3$ m$^3$ S.T.P. db/h, for example in domestic waste incineration, and also in large power stations having, for example, $2\text{-}3 \times 10^6$ m$^3$ S.T.P. db/h.

The mercury re-emission control additives may be added to scrubbers currently used in the industry, including spray towers, jet bubblers, and co-current packed towers. These types of particulate control devices are provided as examples and are not meant to represent or suggest any limitation. In general the mercury re-emission control additives may be introduced into a scrubber and thereby into the scrubber liquor via several routes. For example, a mercury re-emission control additive may be added to a virgin limestone or lime slurry prior to addition to a scrubber, to the recirculation loop of a scrubber liquor, or to a "low solids" return to a scrubber from the scrubber purge stream. The addition of a mercury re-emission control additive, such as a polydithiocarbamic acid compound, can be made in any suitable location in a scrubber process, wholly or fractionally (i.e. a single feed point or multiple feed points), including but not limited to the make-up water for the lime or limestone slurry or the scrubber liquor.

In certain embodiments, the mercury re-emission control additive may be added to a wet scrubber via a "low solids" liquor return. A portion of the liquor is usually continuously removed from the scrubber for the purpose of separating reaction byproducts from unused lime or limestone. One means of separation that is currently used is centrifugation. In this process the scrubber liquor is separated into a "high solids" and "low solids" stream. The high solids stream is diverted to wastewater processing. The low solids fraction returns to the wet scrubber and can be considered "reclaimed" dilute liquor. The mercury re-emission control additives, such as polydithiocarbamic acid compounds, can conveniently be added to the reclaimed low solids stream prior to returning to the scrubber.

In certain embodiments, the mercury re-emission control additive may be added to the wet scrubber via a "virgin liquor." Virgin liquor is the water-based dispersion of either lime or limestone prior to exposure to flue gas and is used to add fresh lime or limestone while maintaining the scrubber liquor level and efficiency of the wet FGD. This is prepared by dispersing the lime or limestone in water. Here the mercury re-emission control additive, such as a polydithiocarbamic acid compound, can be added either to the dispersion water or the virgin liquor directly.

In certain embodiments, the mercury re-emission control additive, such as a polydithiocarbamic compound, may be added to scrubber liquor injected directly into the flue gas prior to the scrubber for the purpose of controlling relative humidity of the flue gas or its temperature.

The scrubber liquors referred to herein may be water-based dispersions of calcium carbonate (limestone) or calcium oxide (lime) used in a wet Flue Gas Scrubber to capture SOx emissions. The liquor may also contain other additives such as magnesium and low-molecular weight organic acids, which function to improve the sulfur capture. One example of such an additive is a mixture of low-molecular weight organic acids known as dibasic acid (DBA). DBA consists of a blend of adipic, succinic, and glutaric acids. Each of these organic acids can also be used individually. In addition, another low-molecular weight organic acid that can be used to improve sulfur capture in a wet scrubber is formic acid. Finally, the scrubber liquor may also contain byproducts of the interaction between the lime or limestone and sulfur species, which leads to the presence of various amounts of calcium sulfite or calcium sulfate. The scrubber liquor may include the make-up liquor, return liquor, the reclaimed liquor, virgin liquor, and/or liquor injected directly into flue gasses.

5. EXAMPLES

The foregoing may be better understood by reference to the following examples, which are presented for purposes of illustration and are not intended to limit the scope of the invention.

Example 1

Correlation Between Scrubber Mercury Levels and Re-Emission and Additive

Mercury determination is based on reducing all aqueous ionic mercury to elemental mercury followed by its quantitative release into air being swept through the sample. The resulting gas-phase elemental mercury is quantified indirectly by atomic absorption spectroscopy. Finally, the gas-phase elemental mercury is captured on an activated carbon packed filter.

Mercury quantification may be accomplished using a RA-915+ Mercury Analyzer, manufactured by Ohio Lumex. The RA-915+ is a portable atomic absorption spectrometer (AAS) with a 10-meter (m) multipath optical cell and Zeeman background correction. The operation of the RA-915+ is based on the principle of differential Zeeman AAS combined with high-frequency modulation of polarized light. This combination eliminates interference and provides the highest sensitivity. The combination of RA-915+ features leads to the direct detection of mercury without preliminary accumulation on a gold trap. The RA-915+ includes a built in test cell for field performance verification. For the purposes of site measurement RA-915+ was used with the optional RP-91C. The RP-91C consists of a gas-phase pump, flow meter and gas/liquid impingers. AAS uses the absorption of light to measure the concentration of gas-phase mercury. The mercury absorbs at 254 nm and makes a transition to higher electron energy state. The gas-phase mercury concentration is determined from the amount of absorption. Concentration measurements are determined from a working curve after calibrating the instrument with standards of known mercury concentration. Site requirements include: a temperature range of 5 to 40 ° C., relative humidity of up to 98%, and atmospheric pressure of 84 to 106.7 kilopascals. Sensitivity of the instrument is reportedly not affected by up to 95% background absorption caused by interfering components (e.g., dust, moisture, organic and inorganic gases).

The laboratory unit is setup sequentially similar to the impingers used in conditionally flue gas samples for continuous mercury monitors. Two impingers are assembled in series. The second impinger is dry and used as a liquid catch prior to the detector. The first impinger of the Ohio Lumex is filled with about 10 mL of deionized water and 2 mL of 2% stannous chloride in 10% hydrochloric acid solution. Stannous chloride, di-hydrate is used to prepare the solution. Analytical grade hydrochloric acid is used to prepare the solutions to insure non-detectable mercury content. The stannous chloride, di-hydrate and concentrated hydrochloric acid are obtained from VWR. Air is pulled through the two impingers to the detector and through the activated carbon filter at a constant rate of 2 mL per hour. To the first impinger containing the reducing agent, an appropriate sample volume is quickly added. The sample's absorption is then converted to mercury concentration using a constructed mercury standard curve.

A standard calibration curve is constructed by use of secondary standards. The normal dynamic analytical range is from 1-100 μg/kg by direct determination without dilution. The standard solutions are prepared in 2% hydrochloric acid solution from Mercury Stock Solution, 1.00 mg/mL mercury in 2% hydrochloric acid, Teledyne Leeman Labs. A standard curve is constructed each day. The secondary standard solution contains 218 ppt mercury as determined by Naperville Analytical laboratory. The overall average slope during the demonstration is $4.74 \times 10^{-5}$ with R2-values typically around 0.998. The percent relative standard deviation, RSD, of the slopes is 3%.

Samples were prepared by filtering scrubber samples through a 0.45 g filter. The filtrate was diluted 1 g to 50 g with deionized water and then digesting with 1 mL of BrCl reagent (available from Leeman) at ambient temperature for at least 18 hours. Excess BrCl was quenched with 0.075 mL of 12% hydroxylamine hydrochloride before analysis.

The information of Example 1 was collected at a commercial energy generation unit (EGU) consisting of two boilers burning high chlorine bituminous coal and equipped with SCR (selective catalytic reduction) catalysts. The combustion gases are combined into a cold-side ESP (electrostatic precipitator) and then through a LSFO wFGD (limestone forced oxidation wet flue gas desulfurizer) before being released to the atmosphere. The chlorine content in the coal is 1200 ppm on an as received basis. The units were monitored using continuous mercury monitors at the inlet of the wFGD and at the stack. Method 30B carbon traps were used to verify the results. The findings are provided in Table 1 below.

TABLE 1

| Condition | Oxidized Hg | Percent Total Hg Capture | Hg Re-emission | Mercury (ppt) |
|---|---|---|---|---|
| Baseline | 94.2 | −7.66 | 70.7 | 9,812 |
| with poly-DTC | 94.3 | 84.5 | 10.4 | 49 |
| w/o poly-DTC | 93.9 | −78.2 | 130 | 17,129 |

In this example, poly-dithiocarbamate (poly-DTC) was added to the wFGD basin to effect reduction of the mercury levels from about 10,000 ppt to less than 100 ppt. It is clear from this example that as the concentration in the basin is reduced, mercury re-emissions is reduced. Subsequently, the addition of poly-DTC was terminated. As can be seen, the mercury levels in the basin returned to near baseline, i.e. 17,000 ppt and re-emissions increased to 100%. This demonstrates a correlation between wFGD liquor concentration and mercury re-emission.

Example 2

Correlation Between Scrubber Mercury Levels and Re-Emission and Additive

This information was collected on a commercial EGU generating 513MWg. The boiler was burning bituminous coal with 400 ppm chloride content. The air quality control devices or AQCDs consisted of a cold-side ESP and LSFO wFGD. Mercury CMMs were used to measure mercury at the inlet of the wFGD and at the stack. A poly-DTC was fed to the wFGD to affect mercury re-emission control. The results are provided in Table 2 below.

TABLE 2

| Condition | Oxidized Hg | Percent Total Hg Capture | Hg Re-emission | Mercury (ppt) |
|---|---|---|---|---|
| Baseline | 84.7 | 38.2 | 55.6 | 51,408 |
| with poly-DTC | 71.4 | 70.3 | −0.71 | 121 |
| w/o poly-DTC | 70.9 | 22.8 | 63.2 | 27,660 |

In this example, the EGU had only 38% mercury capture due to re-emissions of nearly 56%. The baseline wFGD basin liquor concentration was 51,000 ppt. Upon addition of poly-DTC to control mercury re-emissions, the wFGD mercury levels decreased to less than 200 ppt. When this occurred the mercury re-emissions decreased to zero and the total capture of mercury increased to 70%. When addition of poly-DTC was terminated, the wFGD mercury levels increased to 28,000 ppt with a similar increase in mercury re-emission to 63%. This example shows the link between wFGD mercury concentration and re-emission which serves as the control strategy.

Example 3

Correlation Between Scrubber Mercury Levels and Re-Emission and Additive

This example was conducted at an EGU consisting of a 550 MWg boiler firing sub-bituminous coal. The unit air quality control devices (AQCDs) consisted of an electrostatic precipitator for particulate removal and three wet Flue Gas Desulfurization (wFGD) scrubbers for SOx removal. The wFGD scrubbers use sodium-based solutions to capture SOx. In order to increase the flue gas oxidized mercury concentration, a halogen-based boiler additive such as hypochlorite was added. The results are provided in Table 3 below.

TABLE 3

| Condition | Oxidized Hg | Percent Total Hg Capture | Hg Re-emission | Mercury (ppt) |
|---|---|---|---|---|
| Baseline | 84.0 | 51.6 | 23.1 | 14,929 |
| with poly-DTC | 87.4 | 90.2 | −6.10 | 106 |

Baseline, i.e., normal operation without wFGD additives, conditions are seen above. The mercury concentration in the wFGD liquor was nearly 15,000 ppt with a measured mercury re-emission of 23%. Upon addition of poly-DTC to control mercury re-emissions, the wFGD mercury levels decreased to less than 200 ppt with the measured mercury re-emission decreasing to zero percent. This shows that the mercury level in the wFGD can be used to control the addition of poly-DTC, scrubber additive.

Example 4

Laboratory Results Demonstrating Correlation Between Lower ORP Due to Additive and Re-Emissions Control A laboratory experiment was carried out in a laboratory wFGD simulator. The conditions of the test were: pH=4.5, $[SO_3^{2-}]$=0.2 mM, $[Cl^-]$=300 mM. A poly-DTC scrubber additive was introduced to control mercury re-emissions from the laboratory jet bubbler unit at 100 ppm. The results are provided in Table 4 below.

TABLE 4

| Condition | Elemental Mercury Concentration ($\mu g/Nm^3$) Inlet | Outlet | Re-emission | ORP (mV) |
|---|---|---|---|---|
| Baseline | 2 | 14 | 12 | +100 |
| with poly-DTC | 2 | 1 | −1 | −200 |

As can be seen Table 4, the addition of poly-DTC to complex mercury eliminates mercury re-emission while the ORP of the solution becomes more negative or changes in the direction of a reducing potential.

Example 5

ORP and Re-Emissions and Control

The information was collected at a commercial energy generation unit (EGU) consisting of two boilers burning high chlorine bituminous coal and equipped with SCR (selective catalytic reduction) catalysts. The combustion gases are combined into a cold-side ESP (electrostatic precipitator) and then through a LSFO wFGD (limestone forced oxidation wet flue gas desulfurizer) before being released to the atmosphere. The chlorine content in the coal is 1200 ppm on an as received basis. The units were monitored using continuous mercury monitors at the inlet of the wFGD and at the stack.

Method 30B carbon traps were used to verify the results. The results are provided in Table 5 below.

TABLE 5

| Condition | Percent | | | ORP (mV) |
|---|---|---|---|---|
| | Oxidized Hg | Total Hg Capture | Hg Re-emission | |
| Baseline | 94.2 | −7.66 | 70.7 | 540 |
| with poly-DTC | 94.3 | 84.5 | 10.4 | 278 |
| w/o poly-DTC | 93.9 | −78.2 | 130 | 480 |

As can be seen Table 5, at baseline, i.e. before addition of a wFGD additive, mercury re-emission is high at 71% and the ORP is +540 mV. Counter to conventional approaches, the addition of a poly-DTC to control the re-emission results in a decrease in ORP. Indeed, as shown in the above table, there is a correlation between the observed decrease in ORP and mercury re-emission that allows the control of poly-DTC addition.

Example 6

ORP and Re-Emissions and Control

This information was collected on a commercial EGU generating 513MWg. The boiler was burning bituminous coal with 400 ppm chloride content. The air quality control devices or AQCDs consisted of a cold-side ESP and LSFO wFGD. Mercury CMMs were used to measure mercury at the inlet of the WFGD and at the stack. A poly-DTC was fed to the wFGD to affect mercury re-emission control. The results provided in Table 6 below.

TABLE 6

| Condition | Percent | | | ORP (mV) |
|---|---|---|---|---|
| | Oxidized Hg | Total Hg Capture | Hg Re-emission | |
| Baseline | 84.7 | 38.2 | 55.6 | 473 |
| with poly-DTC | 71.4 | 70.3 | −0.71 | 16 |
| w/o poly-DTC | 70.9 | 22.8 | 63.2 | 440 |

As is seen Table 6, prior to addition the EGU was only capturing 38% of the mercury in the combustion gas due to in part 57% mercury re-emission across the wFGD. The ORP at this condition is about +473 mV. The addition of the wFGD additive to control mercury re-emission resulted in a decrease, i.e. a more reducing potential, in ORP (i.e. +16 mV) and reduction of mercury re-emission to near zero percent. The overall capture increased to 70%, which matched the total oxidized mercury in the combustion gas at the inlet to the wFGD. As expected, upon cessation of addition of the poly-DTC, the ORP increased (i.e. more oxidative potential), mercury re-emission increased to 64%, and the mercury capture decreased to 23%. This shows the use of ORP to control the addition of poly-DTC.

Example 7

ORP and Re-Emissions and Control

This example was conducted at an EGU consisting of a 550 MWg boiler firing sub-bituminous coal. The unit air quality control devices (AQCDs) consist of an electrostatic precipitator for particulate removal and three wet Flue Gas Desulfurization (wFGD) scrubbers for SOx removal. The wFGD scrubbers use sodium-based solutions to capture SOx. In order to increase the flue gas oxidized mercury concentration, a halogen-based boiler additive such as hypochlorite was introduced. The results provided in Table 7 below.

TABLE 7

| Condition | Percent | | | ORP (mV) |
|---|---|---|---|---|
| | Oxidized Hg | Total Hg Capture | Hg Re-emission | |
| Baseline | 84.0 | 51.6 | 23.1 | −65 |
| with poly-DTC | 87.4 | 90.2 | −6.10 | −212 |

This example demonstrates that an "absolute" value of ORP of greater than +200 mV and up to +2000 mV is not applicable here. At baseline, the solution ORP is −65 mV with mercury re-emission at 23% and total capture at only 52%. The addition of a poly-DTC to reduce the ORP to around −212 mV results in near zero mercury re-emission and mercury capture of 90%. The ORP became more negative or more reducing compared to baseline.

While not wanting to be limited by theory, the above observation is consistent with the removal of ionic mercury from wFGD liquor. The removal of the ionic mercury reduces potentially oxidizing species from the solution being monitored. In theory, this should result in a decrease in the solution ORP or a more negative number. This is indeed observed in the above examples and is unexpected. The correlation between feed of poly-DTC and ORP or mercury concentration in the wFGD demonstrates the link that is unexpectedly found in this disclosure.

Example 8

Use of Soluble Mercury Concentration in the Scrubber Liquor

Figure 1B:
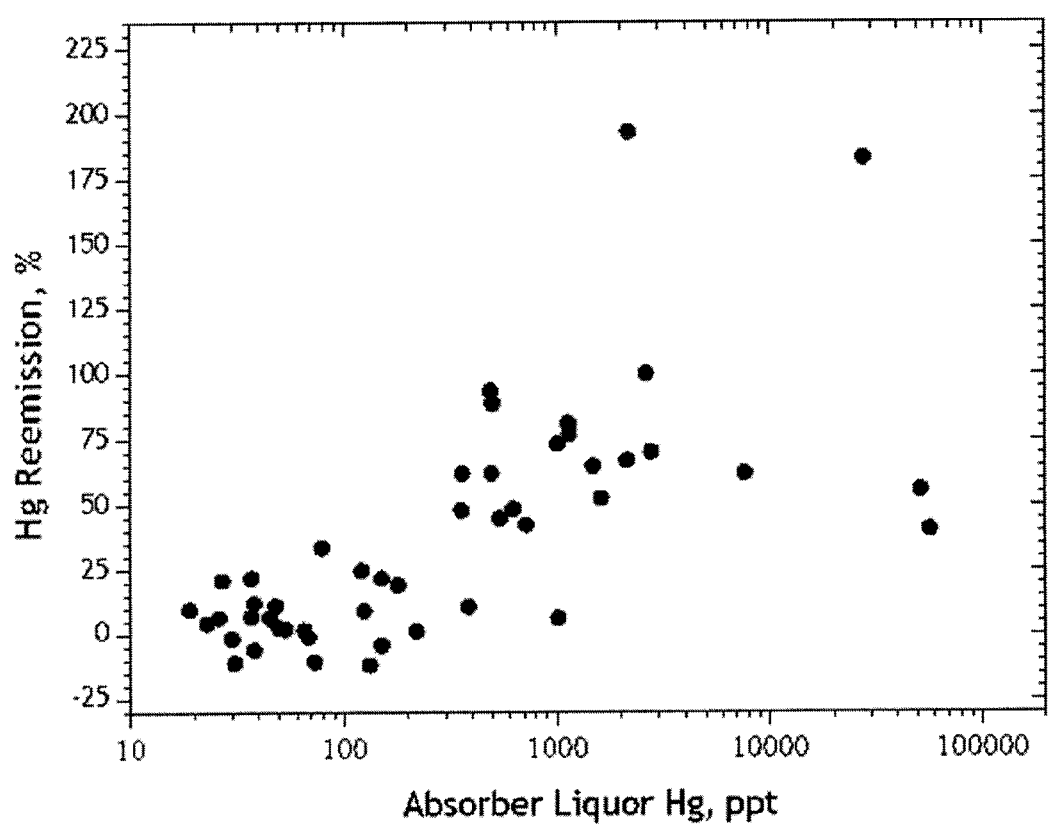
FIG. 1b shows the correlation between mercury re-emission (flue gas mercury emissions) and mercury concentration in the scrubber liquor.

FIGS. 1a and 1b demonstrate that controlling mercury concentration in a scrubber liquor is an effective method of controlling mercury re-emission. The lower the mercury concentration in the scrubber, the lower the mercury re-emission and hence the lower the unit mercury emissions.

One method of controlling mercury re-emission includes adding sufficient mercury re-emission control additive to reduce the soluble mercury level in a basin liquor to or below 500 ppt, preferably below 200 ppt. An upper limit may be set to 1000 ppt as a starting point. Once the level gets to below this limit, a maintenance dose may be included that is based on the incoming total mercury in the flue gas or coal source. The maintenance dose may vary depending on the scrubber retention time or the negative of the blow down rate. The control ratio may be between 2000 to 1, 1500 to 1, 900 to 1, 500 to 1, 100 to 1, or 50 to 1 weight to weight ratio of active to mercury total at the inlet.

Example 9

Use of Oxidation-Reduction Potential or ORP

Figure 2A:
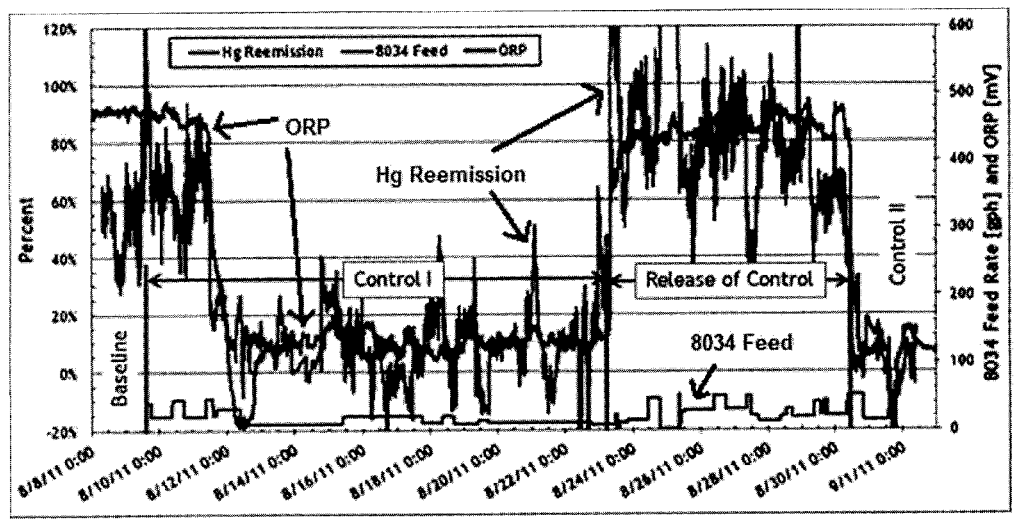
FIG. 2a depicts a percent mercury re-emission controlled by measuring scrubber liquor oxidation-reduction potential and adjusting addition rate of a mercury re-emission control additive.
Figure 2B:
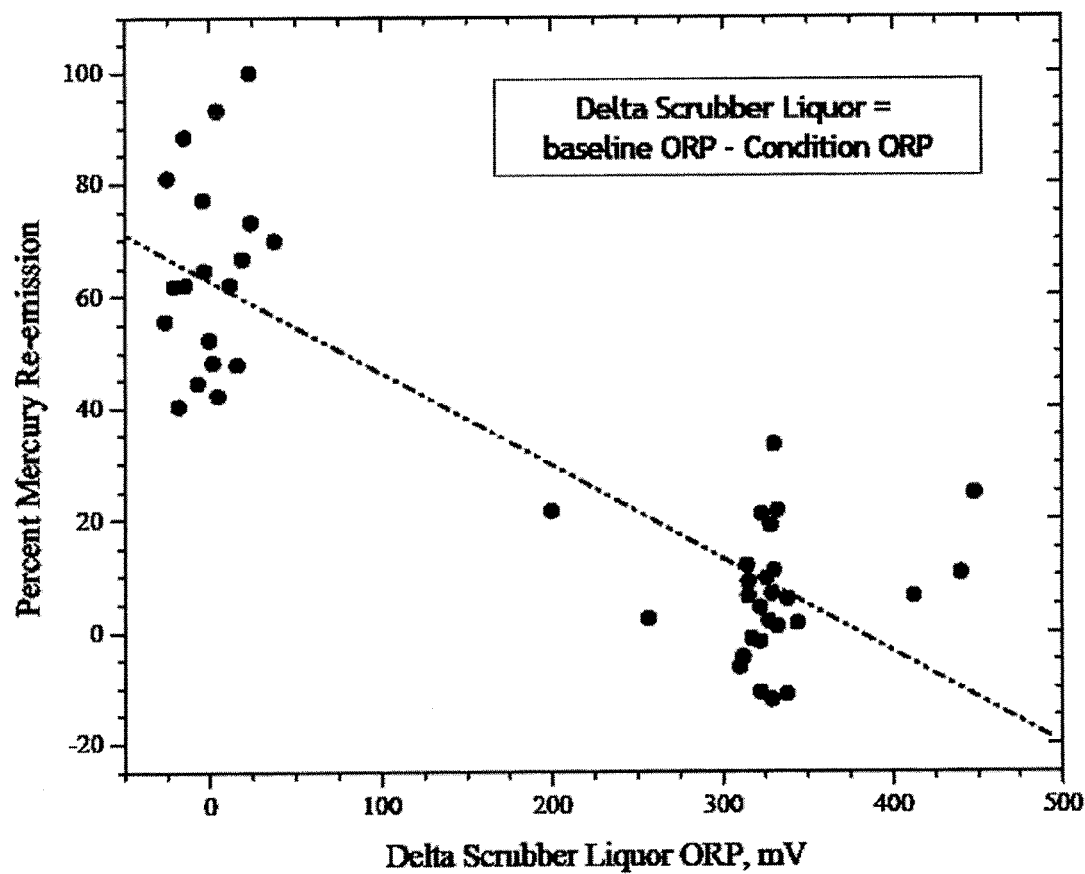
FIG. 2b depicts the relationship between the change in oxidation-reduction potential (i.e., delta scrubber liquor ORP), and resulting mercury re-emission.

FIGS. 2a and 2b demonstrate that ORP is an effective, indirect, measure of mercury re-emission in a wet forced oxidation scrubber. Dose of poly-dithiocarbamic compound (e.g., MerControl 8034) can be directly tied to changes in the ORP. Once the ORP is less than 100 mV, the maintenance feed rate can be started based on the incoming mercury concentration found in the fuel (e.g., coal). The ORP value may be different for each scrubber type, amount of forced oxidation, scrubber efficiency and so on. The higher the delta value (i.e., change in ORP), the more reducing the liquor may become.

Figure 2C:
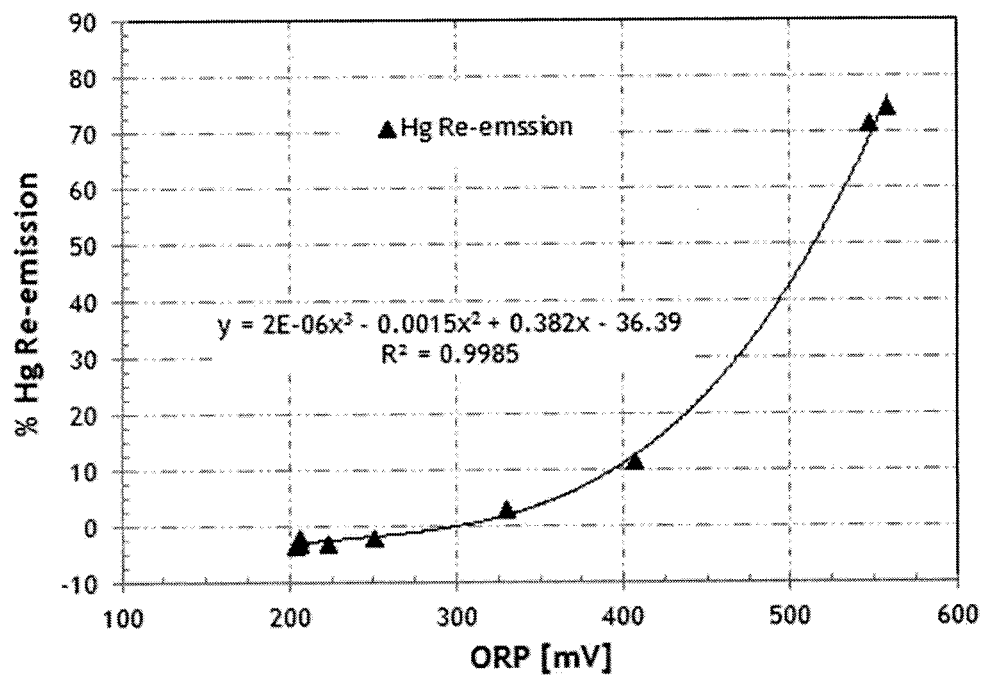
FIG. 2c depicts data showing a correlation between ORP and percent mercury re-emission with a correlation coefficient of 0.999.

FIG. 2c shows data collected from a commercial 500+ MW coal-fired electricity generating unit (EGU). The boiler was fired with eastern bituminous coal. The EGU was equipped with a selective catalytic reduction device (SCR) and a wet flue gas desulfurizer (wFGD) employing limestone in a forced oxidation operation. Flue gas mercury concentration and speciation were determined using continuous mercury monitors (CMMs) located at the inlet and exit of the wFGD. All measurements were made at full load of the unit and confirmed periodically with Method 30B carbon traps. The ORP (oxidation-reduction potential) was measured continuously using commercially available instrumentation and reported relative to a silver/silver chloride reference electrode at wFGD operating temperature. Percent mercury re-emission was calculated using the following equation:

$$\text{Hg Re-emission [\%]} = \left( \frac{[Hg^\circ_{stack}] - [Hg^\circ_{inlet}]}{[Hg^T_{inlet}] - [Hg^\circ_{inlet}]} \right) \times 100$$

The results show a correlation between ORP and percent mercury re-emission with a correlation coefficient of 0.999. This is a good correlation using plant data showing the predictive nature of ORP relative to mercury re-emission.

Example 10

Use of Sulfide Concentration

Figure 3:
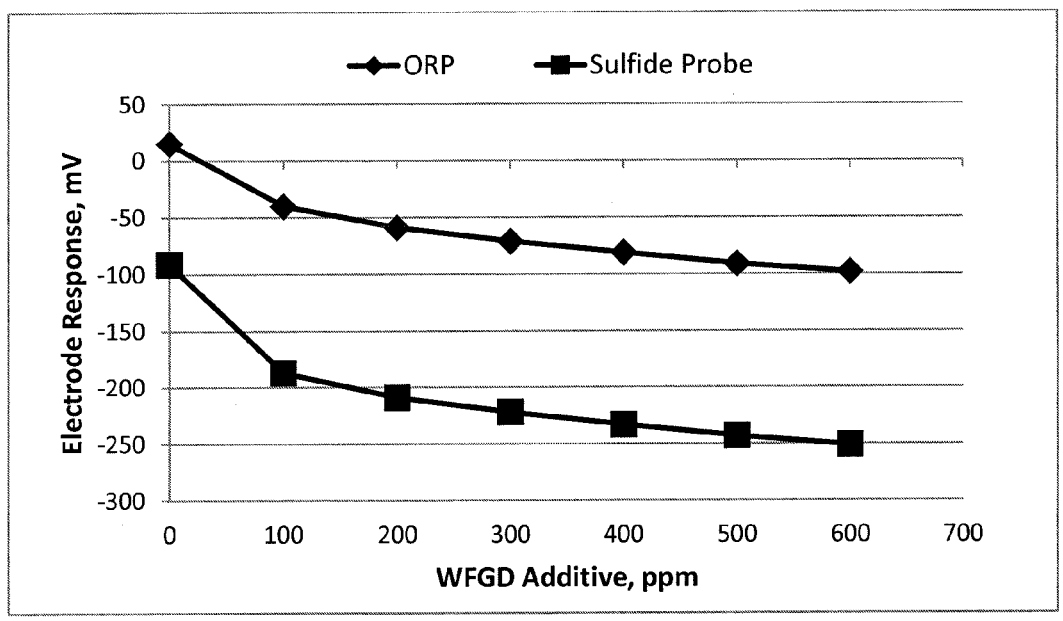
FIG. 3 depicts electrode responses of oxidation-reduction potential (ORP) electrode (diamonds) and sulfide ion-selective electrode (ISE, squares) as a function of increasing wFGD additive in a 0.1 M $Na_2SO_4$ electrolyte solution.

Data from the laboratory and the field demonstrate the usefulness of a sulfide ion-selective electrode (ISE) for wFGD additive dosage control for preventing mercury re-emission and thus lowering overall mercury emissions at coal-fired power plants. FIG. 3 shows data collected in the laboratory in which the mercury re-emission control additive was added in aliquots to an electrolyte solution (0.1 M sodium sulfate, $Na_2SO_4$, in deionized water). The responses of an oxidation-reduction potential (ORP) electrode and a sulfide selective ion-selective electrode (ISE) were compared. It can be seen that both react to the addition of the mercury re-emission control additive in a similar manner.

Figure 4:
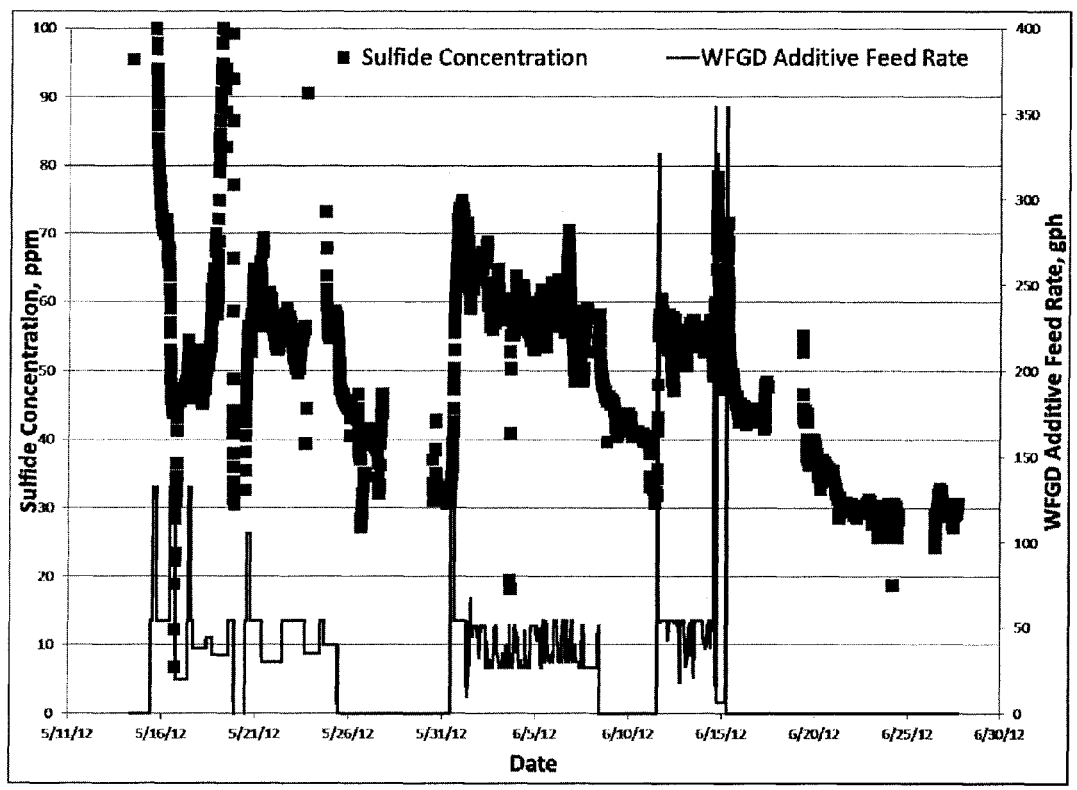
FIG. 4 depicts data collected in the field in real-time during a wFGD additive demonstration to control mercury re-emission across a wFGD scrubber. The solid line data on the lower portion of the graph represents the feed rate of the wFGD additive and corresponds to the secondary y-axis. The data points shown in squares on the top portion of the graph correspond to the primary y-axis and represent the sulfide concentration in the wFGD scrubber liquor as measured by an in-line sulfide ISE.

FIG. 4 shows data collected in the field in real-time during a wFGD additive demonstration to control mercury re-emission across the wFGD scrubber. The solid line data on the lower portion of the graph represents the feed rate of the wFGD additive and corresponds to the secondary y-axis. The data points shown in squares on the top portion of the graph correspond to the primary y-axis and represent the sulfide concentration in the wFGD scrubber liquor as measured by the in-line sulfide ion-selective electrode. It can be seen that increases of the mercury re-emission control additive feed lead to increases in sulfide concentration.

The foregoing examples demonstrate that scrubber liquor ionic mercury concentration, oxidation-reduction potential, and sulfide ion concentration may be used individually or collectively to monitor mercury re-emission and adjust the rate of addition of mercury re-emission control additive to reduce mercury re-emission or maintain a selected level of mercury re-emission.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety.

What is claimed is:

1. A method of controlling mercury re-emission from a combustion process, the method comprising:
   (a) measuring either mercury concentration, oxidation-reduction potential (ORP), and/or sulfide concentration within a scrubber liquor of a wet flue gas desulpherizer (wFGD);
   (b) correlating the mercury concentration, ORP, and/or sulfide concentration with an amount of mercury re-emission additive required in the scrubber liquor to reduce and/or prevent mercury re-emission to a selected level; and
   (c) adjusting the rate of addition of mercury re-emission additive into the scrubber liquor to attain the selected level of mercury re-emission.

2. The method of claim 1, wherein mercury concentration is measured.

3. The method of claim 1, wherein oxidation-reduction potential is measured.

4. The method of claim 1, wherein sulfide concentration is measured.

5. The method of claim 1, wherein the rate of addition of mercury re-emission control additive is adjusted to reduced the scrubber liquor ionic mercury concentration to less than 500 ppt.

6. The method of claim 1, wherein the rate of addition of mercury re-emission control additive is adjusted to reduce the scrubber liquor ionic mercury concentration to less than 200 ppt.

7. The method of claim 1, wherein the rate of addition of mercury re-emission control additive is adjusted to reduce the scrubber liquor ionic mercury concentration to less than 200 ppt and the percent mercury re-emission from the scrubber liquor is reduced to 10% or less.

8. The method of claim 1, wherein the rate of addition of mercury re-emission control additive is adjusted to reduce the scrubber liquor mercury concentration to less than 100 ppt and the percent mercury re-emission from the scrubber liquor is reduced to 1% or less.

9. The method of claim 1, wherein the ORP value is measured, and the rate of addition of mercury re-emission control additive is adjusted to reduce the scrubber liquor oxidation-reduction potential by 100 mV.

10. The method of claim 1, wherein the ORP value is measured, and the rate of addition of mercury re-emission control additive is adjusted to reduce the scrubber liquor oxidation-reduction potential by 300 mV.

11. The method of claim 1, wherein the ORP value is measured, and the rate of addition of mercury re-emission control additive is adjusted to reduce the scrubber liquor oxidation-reduction potential by 400 mV.

12. The method of claim 1, wherein the oxidation-reduction potential of the scrubber liquor is measured prior to adjusting the rate of addition of mercury re-emission control additive to provide a baseline, wherein the rate of addition of mercury re-emission is control additive is thereafter increased to reduce the scrubber liquor oxidation-reduction potential by 50-400 mV.

13. The method of claim 12, wherein the reduction of the scrubber liquor oxidation-reduction potential by 50-400 mV correlates to a decrease in mercury re-emission from the scrubber liquor to a value of 20% mercury re-emission or less.

14. The method of claim 12, wherein the reduction of the scrubber liquor oxidation-reduction potential by 50-400 mV correlates to a decrease in mercury re-emission from the scrubber liquor to a value of 10% mercury re-emission or less.

15. The method of claim 12, wherein the reduction of the scrubber liquor oxidation-reduction potential by 50-400 mV correlates to a decrease in mercury re-emission from the scrubber liquor to a value of 1% mercury re-emission or less.

16. The method of claim 1, wherein the rate of addition of mercury re-emission control additive is adjusted to increase the scrubber liquor sulfide concentration to greater than 20 ppm.

17. The method of claim 1, wherein the rate of addition of mercury re-emission control additive is adjusted to increase the scrubber liquor sulfide concentration to greater than 50 ppm.

18. The method of claim 1, wherein the rate of addition of mercury re-emission control additive is adjusted to increase the scrubber liquor sulfide concentration to greater than 70 ppm.

19. The method of claim 1, wherein the rate of addition of mercury re-emission control additive is adjusted to increase the scrubber liquor sulfide concentration to a range of about 20 ppm to about 100 ppm.

20. The method of claim 1, wherein the rate of addition of mercury re-emission control additive is adjusted to increase the scrubber liquor sulfide concentration to a range of about 30 ppm to about 70 ppm.

21. The method of claim 1, wherein the mercury re-emission control additive is a polydithiocarbamic compound.

22. The method of claim 1, wherein the mercury re-emission control additive is an ethylene dichloride ammonia polymer containing from 5 to 55 mole % of dithiocarbamate salt groups.

23. The method of claim 1, wherein the mercury re-emission control additive is a polymer derived from at least two monomers: acrylic-x and an alkylamine, wherein said acrylic-x has the following formula:

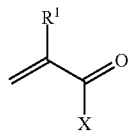

wherein X=OR, OH and salts thereof, or $NHR^2$ and wherein $R^1$ and $R^2$ is H or an alkyl or aryl group, wherein R is an alkyl or aryl group, wherein the molecular weight of said polymer is between 500 to 200,000, and wherein said polymer is modified to contain a functional group capable of scavenging one or more compositions containing one or more metals.

24. The method of claim 23, wherein the functional group capable of scavenging one or more compositions containing one or more metals is a sulfur containing functional group.

25. The method of claim 1, wherein the mercury re-emission control additive is selected from the group consisting of: a poly-dithiocarbamic compound, sodium sulfide, sodium hydrosulfide, sodium bisulfide, a poly-sulfide, diethyldithiocarbamate or a sodium salt thereof, dimethyldithiocarbamate or a sodium salt thereof, an inorganic poly-sulfide or blend, a sodium or calcium salt of 1,3,5-triazine-2,4,6(1H,3H,5H)-trithione, an activated carbon, 2,3-dimercaptopropanol, dimercaptosuccinic acid, 1,8-octanedithiol, 1,2-dithiolane-3-valeric acid, 2-methyl 1,3-dithiolane, and mercaptoacetic acid or a sodium salt thereof.

26. The method of claim 1, wherein at least one of measurement of ionic mercury concentration, oxidation-reduction potential, and sulfide ion concentration is automated.

27. The method of claim 1, wherein adjustment of the rate of addition of mercury re-emission control additive is automatic in response to a measurement of at least one of the ionic mercury concentration, the oxidation-reduction potential, and the sulfide ion concentration.

28. The method of claim 1, wherein at least one of mercury concentration, oxidation-reduction potential, and sulfide ion concentration are continuously monitored.

* * * * *